Patented Oct. 31, 1933

1,933,205

UNITED STATES PATENT OFFICE 1,933,205

PROCESS OF RECOVERING PLASTICIZERS FROM CELLULOID AND LIKE PLASTIC COMPOSITIONS

Harry P. Bassett, Cynthania, Ky.

No Drawing. Application May 15, 1931
Serial No. 537,759

6 Claims. (Cl. 202—56)

This invention relates to the recovery of plasticizers from cellulose products containing the same and in its preferred embodiment relates particularly to the recovery of camphor from celluloid scrap.

The process set forth herein is an improvement on the process described and claimed in my copending application Serial No. 506,284, filed January 2, 1931.

In my copending application referred to I disclose a process of recovering plasticizers from certain cellulosic products, such as celluloid and cellulose acetate plastic compositions, and particularly from the scrap or waste remaining from the manufacture of articles of commerce from such compositions. In the process referred to the cellulosic material treated is intimately contacted with chloroform to dissolve out the plasticizer from the plastic composition treated. The resulting solution of plasticizer in chloroform is introduced into a body of water wherein the plasticizer separates out and may be readily recovered as by centrifuging.

In my copending application referred to, nitrocellulose plastic compositions containing camphor as a plasticizer and cellulose acetate plastic compositions containing triphenyl phosphate or the like as a plasticizer are specified as examples of the type of plastic compositions suitable for treatment in accordance with the process set forth. The process not only recovers the plasticizers but leaves the basic cellulose material in undeteriorated condition so that it may be satisfactorily employed in preparing cellulosic compositons therefrom, as for example lacquers.

In addition to the use of chloroform as a treating agent in the process described I have indicated that some degree of success may be obtained with other materials such as carbon tetrachloride, ether, and benzol but have not recommended the use of such materials for the reason that the percentage of plasticizer recovered is not sufficient for best commercial practice. For example, by using either carbon tetrachloride or ether in the practice of the process, only about 60 per cent. of the plasticizer present can be recovered. With benzol, the recovery is only about 40 per cent. Of course if it should be found desirable to use any of these materials with the correspondingly lowered recovery of plasticizer, such materials may be used instead of chloroform.

Although the process described in the copending application referred to is particularly effective for removing plasticizer from scrap or waste of cellulosic plastic compositions containing the same, I have found that the process described possesses a minor disadvantage in that the material treated takes up from about 2 to 6 per cent. of the treating agent employed whereby there is a continual loss of the treating agent and the basic cellulose material is thereby rendered slightly impure. The purpose of the present invention is to provide a treatment whereby the plasticizer removing solvent remaining in the treated material may be readily removed therefrom and recovered for further use.

I have found that if the cellulosic material from which the plasticizer has been removed and which contains small amounts of the treating solvent, as set forth above, is subjected to the action of a solvent recovering agent of the character specified below, the solvent may be easily removed and recovered. In the practice of the present process, the material which has been treated with a solvent such as chloroform is subjected to the action of a liquid (or vapor of the same) which is a solvent of or is freely miscible with the solvent originally used as a plasticizer recovering agent, such as alcohol, benzene, petroleum, ether, Russian white oil, or the like. In treating the material to recover the residual solvent, the material may be immersed in the solvent recovering agent if it is a liquid, or, if the agent is a vapor, the material may be treated by passing the vapor through a body of the same which for convenience may be arranged in a foraminate container suspended in a treating tank.

In the preferred practice of my process, I employ alcohol as the solvent recovering agent and I prefer to employ the alcohol together with water, any strength of alcohol solution which is capable of dissolving the plasticizer recovering agent being suitable. For example, I have found that particularly good results are obtained by immersing the cellulosic material to be treated in a bath containing 80 per cent. alcohol and 20 per cent. water by volume, and subsequently distilling off the alcohol and dissolved solvent therefrom. I have also found it advantageous to suspend a body of the cellulose material to be treated in a basket and pass alcohol vapors therethrough. According to these two methods of treatment, all but a trace of the solvent originally present in the cellulosic material will be carried out with the alcohol therefrom.

Obviously, after the removal of the solvent from the material treated it is advantageous to separately recover the solvent recovering agent and the solvent which has been removed. This may be accomplished by condensing the treating agent and the solvent and separating them by fractional distillation. For example, when alcohol is used, the combined alcohol and solvent vapors discharged from the treating container are preferably passed through a water cooled condenser and the solvent recovered by fractional distillation. The solvent thus recovered is adapted for further use in removing plasticizers from plastic compositions of the character referred to and the separated solvent recovering agent may be reused in the manner described.

Where the term "solvent" is employed in the appended claims as referring to a liquid (or the same in vapor form) for removing a plasticizer solvent from the treated cellulosic material, the term is intended to cover not only true solvents but also materials which are freely miscible with the plasticizer solvent.

While I have described in detail the preferred embodiment of my invention it is to be understood that the details of procedure may be variously modified without departing from the spirit of the invention or the scope of the subjoined claims.

I claim:

1. The improvement in a process of removing plasticizers from cellulosic plastic compositions containing the same wherein the material to be treated is intimately contacted with a solvent of the plasticizer present and the solvent and dissolved plasticizer are separated from the material treated, which comprises intimately contacting the treated material with alcohol, and separating the alcohol and removed solvent from the material treated.

2. The improvement in a process of removing plasticizers from cellulosic plastic compositions containing the same wherein the material to be treated is intimately contacted with a solvent of the plasticizer present and the solvent and dissolved plasticizer are separated from the material treated, which comprises intimately contacting the treated material with alcohol, and separating the alcohol and removed solvent in vapor form from the material treated.

3. The improvement in a process of removing plasticizers from cellulosic plastic compositions containing the same wherein the material to be treated is intimately contacted with a solvent of the plasticizer present and the solvent and dissolved plasticizer are separated from the material treated, which comprises intimately contacting the treated material with alcohol, separating in vapor form from the material treated the alcohol and removed solvent, condensing the same, and separating the alcohol from the solvent by fractional distillation.

4. The improvement in a process of removing plasticizers from cellulosic plastic compositions containing the same wherein the material to be treated is intimately contacted with a solvent of the plasticizer present and the solvent and dissolved plasticizer are separated from the material treated, which comprises immersing the treated material in a bath comprising water and alcohol, distilling off the alcohol and removed solvent, condensing the discharged vapors, and separating the alcohol from the solvent by fractional distillation.

5. The improvement in a process of removing plasticizers from cellulosic plastic compositions containing the same wherein the material to be treated is intimately contacted with chloroform and the chloroform and dissolved plasticizer are separated from the material treated, which comprises immersing the treated material in a bath of water and a major proportion of alcohol, distilling off the alcohol and removed chloroform, condensing the discharged vapors, and separating the alcohol from the chloroform by fractional distillation.

6. The improvement in a process of removing camphor from celluloid scrap wherein the scrap is intimately contacted with chloroform and the chloroform and dissolved camphor are separated from the scrap, which comprises immersing the treated scrap in a bath comprising approximately 80 per cent. alcohol and 20 per cent. water by volume, distilling off the alcohol and removed chloroform, condensing the discharged vapors, and separating the alcohol from the chloroform by fractional distillation.

HARRY P. BASSETT.